US007783541B1

(12) United States Patent
Rolf (10) Patent No.: US 7,783,541 B1
(45) Date of Patent: Aug. 24, 2010

(54) SYSTEM AND METHOD FOR ALLOCATING FEES ASSOCIATED WITH AN ELECTRONIC TRANSACTION

(75) Inventor: Devon A. Rolf, Paola, KS (US)

(73) Assignee: GoFigure Payments, LLC, Paola, KS (US)

( * ) Notice: Subject to any disclaimer, the term of this patent is extended or adjusted under 35 U.S.C. 154(b) by 137 days.

(21) Appl. No.: 11/485,719

(22) Filed: Jul. 13, 2006

(51) Int. Cl.
G06Q 40/00 (2006.01)
H04M 11/00 (2006.01)
(52) U.S. Cl. .......................................... 705/35; 455/406
(58) Field of Classification Search .............. 705/35–42
See application file for complete search history.

(56) References Cited

U.S. PATENT DOCUMENTS

| | | | |
|---|---|---|---|
| 5,806,045 A | 9/1998 | Biorge et al. | |
| 5,870,722 A | 2/1999 | Albert et al. ................... | 705/39 |
| 5,987,429 A * | 11/1999 | Maritzen et al. .............. | 705/31 |
| 5,992,738 A | 11/1999 | Matsumoto et al. | |
| 6,038,552 A | 3/2000 | Fleischl et al. ................ | 705/44 |
| 6,098,053 A | 8/2000 | Slater | |
| 6,119,106 A * | 9/2000 | Mersky et al. ................ | 705/40 |
| 6,233,568 B1 | 5/2001 | Kara | |
| 6,347,305 B1 | 2/2002 | Watkins ....................... | 705/26 |
| 6,829,588 B1 | 12/2004 | Stoutenburg et al. .......... | 705/30 |
| 6,868,391 B1 | 3/2005 | Hultgren | |
| 6,876,979 B2 * | 4/2005 | Ling ........................... | 705/26 |
| 7,089,208 B1 | 8/2006 | Levchin et al. ................ | 705/39 |
| 7,376,583 B1 | 5/2008 | Rolf ............................ | 705/17 |
| 7,480,372 B2 * | 1/2009 | Jin et al. ................ | 379/115.01 |
| 2001/0016835 A1 | 8/2001 | Hansmann et al. | |
| 2002/0152160 A1 | 10/2002 | Allen-Rouman et al. | |
| 2002/0152168 A1 | 10/2002 | Neofytides et al. | |
| 2003/0004868 A1 | 1/2003 | Early et al. ................... | 705/39 |
| 2003/0139999 A1 | 7/2003 | Rowe | |
| 2003/0144942 A1 | 7/2003 | Sobek ....................... | 705/36 R |
| 2004/0033797 A1 * | 2/2004 | Raivisto et al. .............. | 455/405 |
| 2004/0039694 A1 | 2/2004 | Dunn et al. ................... | 705/39 |
| 2004/0111361 A1 | 6/2004 | Griffiths et al. ............... | 705/39 |
| 2004/0111370 A1 | 6/2004 | Saylors et al. ................ | 705/40 |
| 2004/0225545 A1 | 11/2004 | Turner et al. ................... | 705/8 |
| 2005/0027700 A1 * | 2/2005 | Turner et al. ................... | 707/3 |
| 2005/0033691 A1 | 2/2005 | Whewell et al. .............. | 705/40 |
| 2005/0037731 A1 | 2/2005 | Whewell et al. ............ | 455/406 |
| 2005/0044018 A1 | 2/2005 | Whewell | |
| 2005/0149416 A1 | 7/2005 | Benco et al. | |
| 2005/0256802 A1 * | 11/2005 | Ammermann et al. ........ | 705/44 |
| 2006/0026099 A1 | 2/2006 | Danz et al. | |
| 2006/0129504 A1 | 6/2006 | Nakajima ..................... | 705/75 |
| 2006/0212393 A1 | 9/2006 | Lindsay Brown ............ | 705/40 |

(Continued)

OTHER PUBLICATIONS

"Why Cingular's Allying with a P-to-P Upstart", Daniel Wolfe. American Banker. New York: N.Y. Jun. 9, 2006. vol. 171, Iss. 110; p. 1.*

(Continued)

*Primary Examiner*—Ella Colbert
*Assistant Examiner*—Mohammad Z Shaikh
(74) *Attorney, Agent, or Firm*—Hovey Williams LLP (57) ABSTRACT

A system and method for determining and allocating fees arising from or otherwise associated with an electronic transaction, particularly the processing of a purchase or other financial transaction, wherein the fees or portions thereof are allocated to various parties.

48 Claims, 4 Drawing Sheets

U.S. PATENT DOCUMENTS

| | | | |
|---|---|---|---|
| 2006/0224477 | A1 | 10/2006 | Garcia et al. ............... 705/32 |
| 2006/0248015 | A1 | 11/2006 | Baartman et al. |
| 2006/0289621 | A1 | 12/2006 | Foss, Jr. et al. |
| 2006/0294025 | A1* | 12/2006 | Mengerink ............... 705/77 |
| 2007/0022214 | A1 | 1/2007 | Harcourt |
| 2007/0061242 | A1* | 3/2007 | Ramer et al. ............... 705/37 |
| 2007/0149168 | A1* | 6/2007 | Hariki ............... 455/405 |
| 2007/0156579 | A1 | 7/2007 | Manesh |
| 2007/0203836 | A1* | 8/2007 | Dodin ............... 705/44 |
| 2007/0287413 | A1* | 12/2007 | Kleitsch et al. ............ 455/405 |
| 2008/0010190 | A1* | 1/2008 | Rackley Iii et al. ........... 705/39 |
| 2008/0195498 | A1 | 8/2008 | Crawford et al. |

OTHER PUBLICATIONS

"Consortium to challenge Qualcomm", Jennifer Davies. The San Diego Union, Calif, Nov. 18, 2001, p. H.1.*

Burkitt-Gray, "Starting to brew in Europe", Global Telecoms Business. London: Mar./Apr. 2005. p. 1.*

Charaborty, Pradeep, "Portal to the Profit Land", Wireless Week, Sep. 10, 2001, pp. 43, 46.*

Wolfe, Daniel, "Why Cingular's Allying with a P-to-P Upstart", American Banker. New York, N.Y.: Jun. 9, 2006. vol. 171, iss 110; p. 1.*

"Air2Web Provides Media Companies and Content Providers with Nation's Most Expansive Mobile Delivery Service", Business Wire. New York: Oct. 20, 2004. p. 1.*

U.S. Appl. No. 11/485,700, filed Jul. 13, 2006 (spec and claims as filed) U.S. Appl. No. 11/485,700, Office Action dtd May 13, 2008.

Amendment dated Nov. 13, 2008, as filed in response to the non-final Office Action dated May 13, 2008, in U.S. Appl. No, 11/485,700, filed: Jul. 13, 2006; Applicant: Rolf, Devon A.

Restriction Requirement dated Jan. 29, 2009, in U.S. Appl. No. 11/485,700, filed: Jul. 13, 2006; Applicant: Rolf, Devon A.

Response to Restriction Requirement dated Mar. 27, 2009, as filed in response to the Restriction Requirement dated Jan. 29, 2009, in U.S. Appl. No. 11/485,700, filed: Jul. 13, 2006; Applicant: Rolf, Devon A.

Final Office Action dated May 29, 2009, in U.S. Appl. No. 11/485,700, filed: Jul. 13, 2006; Applicant: Rolf, Devon A.

Amendment and Interview Summary dated Sep. 17, 2009, as filed in response to the final Office Action dated May 29, 2009, in U.S. Appl. No. 11/485,700, filed Jul. 13, 2006; Applicant: Rolf, Devon A.

Interview Summary dated Aug. 21, 2009, in U.S. Appl. No. 11/485,700, filed: Jul. 13, 2006; Applicant: Rolf, Devon A.

"Sprint and eONE Global Announce Plans to Create First Interoperable Mobile Payments Network", eONE Global. May 22, 2002 <http://www2.prnewswire.com/cgi-bin/stories.pl?ACCT=104&STORY=/www/story/05-22-...>.

Toward The Single Account; United States Banker, Company/Corporate Profile/Review; Dec. 16, 1974, pp. 5-6.

Burkitt-Gray, Alan. "Starting to brew in Europe". ProQuest. Mar./Apr. 2005 <http://proquest.umi.com>.

* cited by examiner

SYSTEM AND METHOD FOR ALLOCATING FEES ASSOCIATED WITH AN ELECTRONIC TRANSACTION

BACKGROUND OF THE INVENTION

1. Field of the Invention

The present invention relates broadly to systems and methods for processing electronic transactions. In particular, the present invention concerns a system and method for determining and allocating fees arising from or otherwise associated with an electronic transaction, particularly the processing of a purchase or other financial transaction, wherein the fees or portions thereof are allocated to various parties.

2. Description of the Prior Art

Systems and methods for making or otherwise facilitating electronic purchase transactions of goods and services using a wide variety of electronic and non-electronic devices are known or have been proposed. In addition to conventional debit and credit card transactions, for example, various tele-commerce methods and systems have also been proposed.

SUMMARY OF THE INVENTION

The present invention concerns a system and method for determining and allocating fees arising from or otherwise associated with an electronic transaction, particularly the processing of a purchase or other financial transaction, wherein the fees or portions thereof are allocated to various parties. More specifically, the present invention provides an electronic gateway and transaction processing and settlement operations. The system broadly comprises a server having a processor and a database memory, with the server being connected by a communications network to inputs necessary for electronic transactions to occur, as well as to other servers and memories associated with banking or financial institutions or to accounts of merchants at which purchases are being made.

In a preferred embodiment of the present invention, when an account holder initiates a purchase transaction, information indicative of the account holder and the merchant with which the transaction is to be made are received by the processor which operates in a substantially automatic and conventional manner to authorize, process, and settle the transaction. The party associated with the processor charges one or more fees (such as a transaction fee and a discount fee) for this service. Additionally, however, the processor utilizes the received information to allocate a portion of the fee to or set aside additional fees for one or more other parties which may be entitled to a fee, as has been agreed upon in advance by the account holder making the transaction, the merchant, or the party which is itself processing the transaction.

More specifically, the processor determines whether a communications carrier, a debit or credit card provider or another card processor, an electronic portal, an endorser or advertising agency, or one or more hardware entities are entitled to a fee (or a portion of the fee that has been established). After making these determinations, the processor allocates the appropriate fee to each of the parties entitled to a fee, and stores information indicative thereof in memory. The processor may then transmit to an account associated with each of the parties entitled to a fee data indicative of that party's allocated portion of the fee. Alternatively, the respective fees may be maintained in an escrow account and distributed to the respective parties at an agreed upon time (which may or may not be the same time for each party).

In accordance with an additional aspect of the present invention, monies held in an escrow account may accrue interest, and a party's pro-rated portion of that interest may also be distributed in a timely manner, along with the principle part of the fee, at an agreed upon payment date. Alternatively, interest accrued on the account may be allocated to a single party, such as the party processing the transaction. Additionally, the party processing the transaction may charge additional fees to each of the other parties for such services as managing the allocation of the fee portions, holding and distributing the monies in a timely manner, and providing reports.

BRIEF DESCRIPTION OF THE DRAWINGS

A preferred embodiment of the present invention is described in detail below with reference to the attached drawing figures, wherein.

DETAILED DESCRIPTION OF THE PREFERRED EMBODIMENTS

Figure 1:
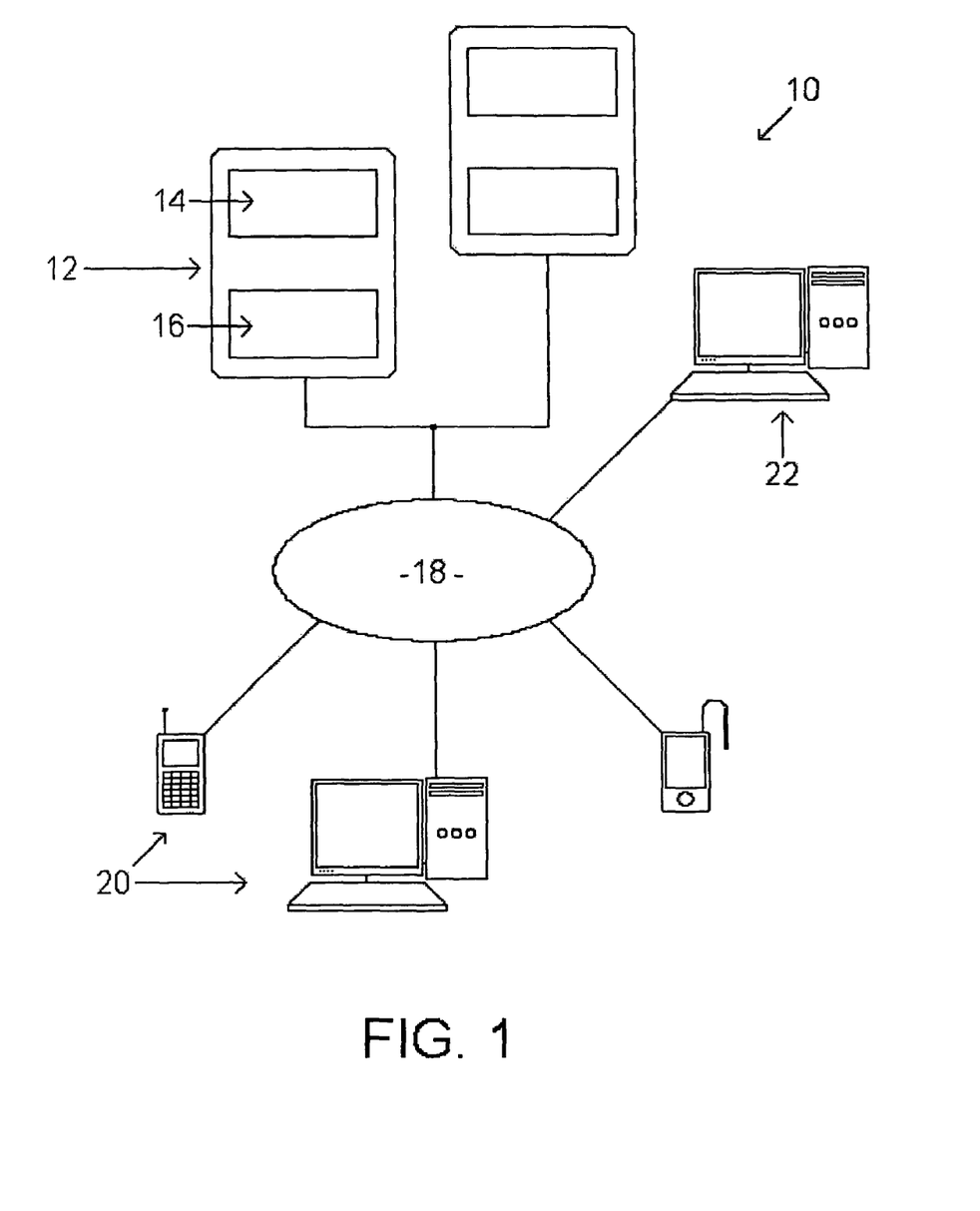
FIG. 1 is a system diagram of a preferred embodiment of the system of the present invention.

With reference to the figures, a system 10 and method are herein described, shown, and otherwise disclosed in accordance with the preferred embodiments of the present invention. Broadly, the system 10 and method are adapted and operable to substantially automatically process electronic transactions, particularly purchase or other financial transactions, wherein a fee associated with each transaction is determined and allocated among various parties. More specifically, the present invention provides an electronic gateway and transaction processing and settlement operations. As shown in FIG. 1, the system 10 broadly comprises one or more servers 12 having one or more processors 14 and further having or accessing one or more database memories 16. The servers 12 are connected by one or more communications networks 18 to electronic devices 20 for initiating the transactions, as well as to other processors, computing devices 22, and memories associated with banking or financial institutions or to accounts of merchants or providers from which purchases are made. The electronic devices 20 may include, for example, wireless or hardwired communications devices including telephones, computers, and dedicated devices; desktop, laptop, and hand-held devices; and mobile and non-mobile devices.

Figure 2:
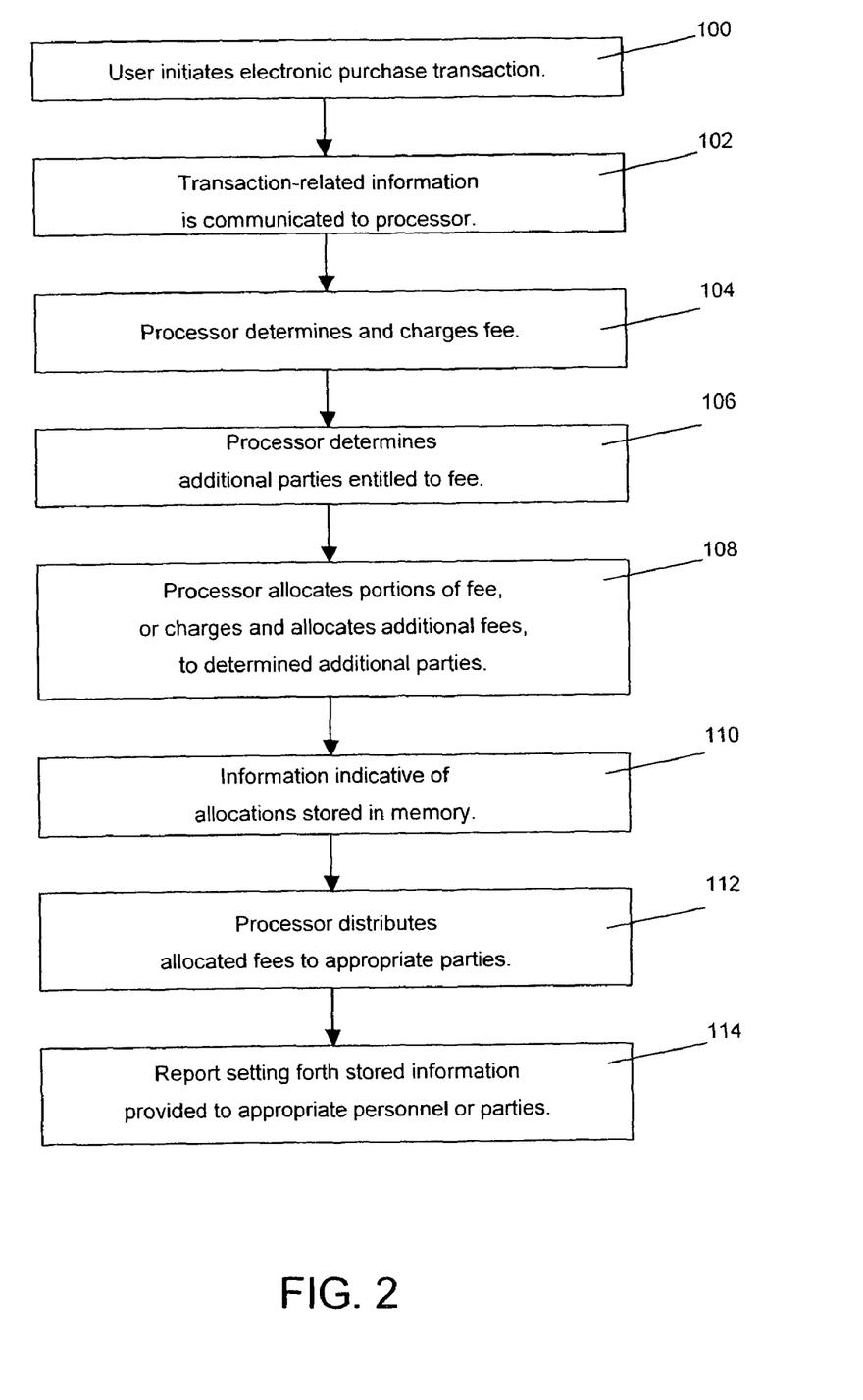
FIG. 2 is a first flowchart of steps involved in practicing a preferred embodiment of the method of the present invention.

Referring particularly to FIG. 2, a user initiates an electronic purchase transaction using the device 20, as indicated by step 100. It will be understood and appreciated that the transaction may be initiated in any of a wide variety of ways. The transaction may, for example, be a conventional debit or credit card transaction, or it may involve an account associated with the device 20 or a carrier as the debit or credit account itself. Additionally, the transaction may be initiated in any of a wide variety of manners. The transaction may be initiated, for example, as a mobile commerce transaction or an eCommerce transaction, and via the Internet, interactive television or interactive radio, or telematics technology.

Initiation of the transaction causes transaction-related information to be communicated via the communications network to the processor 14, as indicated by step 102. The transaction-related information may include, for example, information about the user and merchant, or directions for accessing such information; information about the nature of the transaction; information about other parties who may be involved in facilitating or completing the transaction (e.g., the identities of the manufacturer of the device 20, the carrier supporting communications using the device 20, and any other entity who may be entitled to a fee as a result of the transaction).

Based upon the received transaction-related information, the processor 14 allocates or charges a fee, as indicated by step 104. The fee may, for example, be consideration for authorization, processing, and settlement services. The fee is preferably a percentage of the monetary value of the transaction (perhaps subject to pre-established and agreed upon minimums and maximums), though it could alternatively be a fixed fee. Generally, the fee would not be added to the purchase price charged to the user for the goods or services being purchased, but would be included in the overall purchase price.

Also based upon the received transaction-related information, the processor 14 determines which additional parties may be entitled to a fee as a result of the transaction, as indicated by step 106. In this regard, in one embodiment of the present invention, portions of the fee determined and charged at step 104 are allocated to these additional parties. In an alternative embodiment of the present invention, it is not portions of the earlier-determined fee that are allocated, but rather additional fees are determined, charged, and allocated to the respective parties. Once the additional parties are determined, the processor 14 allocates the portions of the fee, or allocates additional fees, to those parties, as indicated by step 108. The fee portions and additional fees are hereinafter referred to generally as fees. Information indicative of these allocations may be stored in the memory 16, as indicated by step 110.

The processor 14 may thereafter electronically or otherwise arrange for distribution of the allocated fees to the appropriate parties, as indicated by step 112. A report setting forth stored information may be periodically printed and mailed, emailed, or otherwise provided to appropriate personnel or parties, as indicated by step 114. It will be understood and appreciated that the processor 14 preferably processes the transactions of a large number of account holders using a wide variety of different services and account types.

Figure 3:
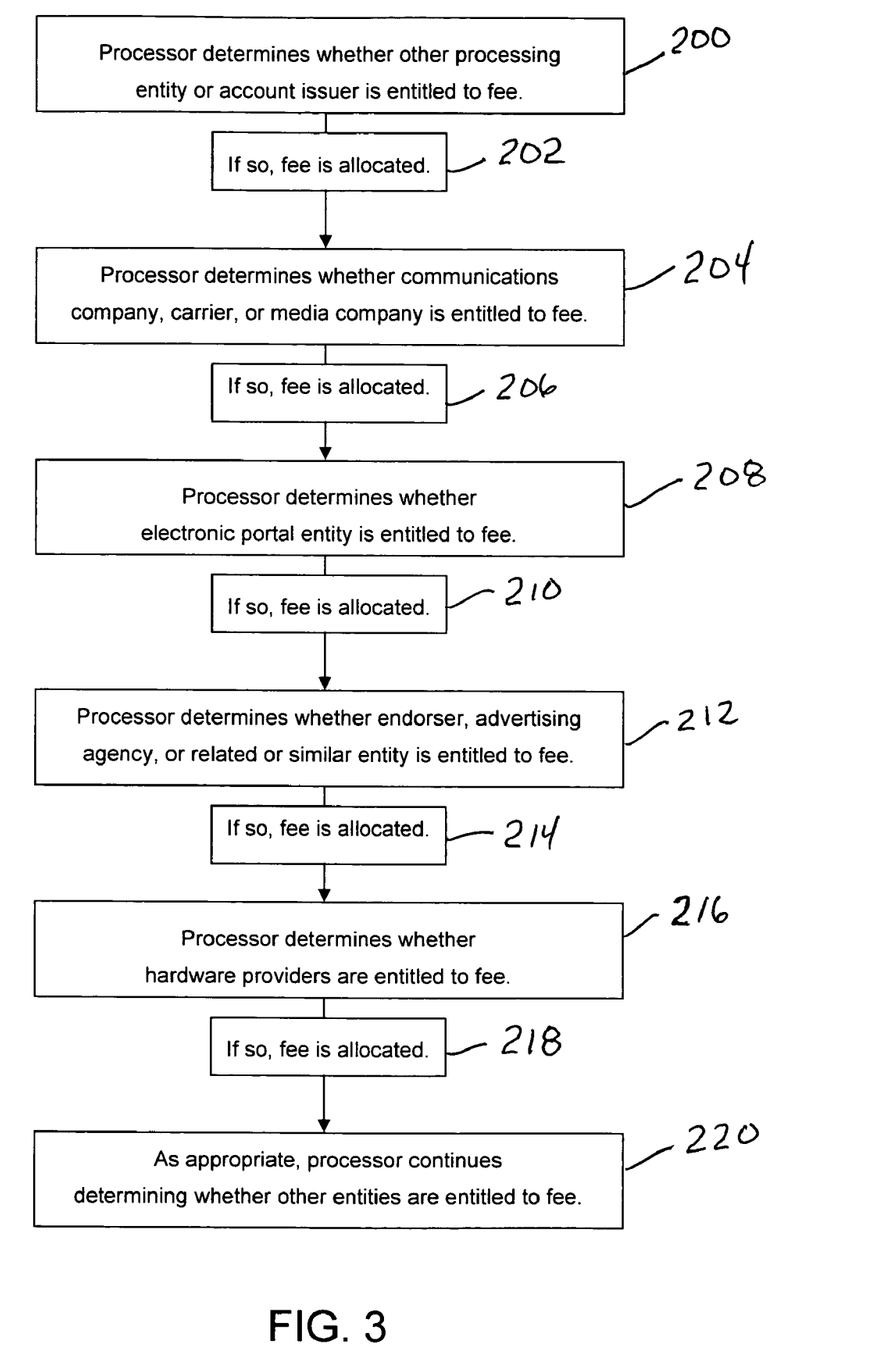
FIG. 3 is a second flowchart illustrating in greater detail the steps in which fee portions are allocated to certain entities.

Referring particularly to FIG. 3, the process of allocating fees to respective entities is described in detail. The processor 14 determines whether there is another card processing entity involved, or a payment network such as VISA, Master Card, or American Express, or an account issuer, such as a bank, which is entitled to fees, as indicated by step 200. It will be understood that step 200 may actually be accomplished in two steps, but has been illustrated singularly. Once it has been determined at step 200 that there is such an entity entitled to a fee, the processor 14 allocates the fee to the entity by storing information indicative thereof in memory, as indicated by step 202.

Once the allocation has been made, or once it is determined at step 200 that there is no additional entity entitled to a fee, the processor 14 determines whether there is a communications company, carrier, content aggregator, provider of search services, or media company which is entitled to a fee, as indicated by step 204. Again, it will be understood and appreciated that step 204 may actually involve several steps for each of these different potential entities. Once it has been determined at step 204 that such a fee is indeed to be allocated, the allocation is made, as indicated by step 206.

Once processing at step 206 is complete, or once it is determined at step 204 that there is no such entity entitled to a fee, the processor 14 determines whether there is an electronic portal entity that is entitled to a fee, as indicated by step 208. It will be understood and appreciated that, in addition to an electronic portal, it may be a content aggregator or similar or related entity that is entitled to a fee. Once it has been determined at step 208 that there is such an entity entitled to a fee, the fee is allocated, as indicated by step 210.

Once processing at step 210 is complete, or once it is determined at step 208 that there is no such entity which is entitled to a fee, the processor 14 determines whether an endorser, advertising agency, or related or similar entity is entitled to a fee, as indicated by step 212. Again, it will be understood that step 212 may be divided into substeps to accommodate the various types of entities that may fall into this category. Once it has been determined at step 212 that there is such an entity or entities entitled to a fee, the fee or fees are allocated, as indicated by step 214.

Once processing at step 214 is complete, or once it is determined at step 212 that there is no such entity entitled to a fee or a portion thereof, the processor 14 determines whether there are any hardware providers which are entitled to a fee, as indicated by step 216. Once it has been determined at step 216 that there is such an entity entitled to a fee, the fee is allocated, as indicated by step 218.

Upon completion of processing at step 218, or once it is determined that there are no such entities entitled to a fee at step 216, processing may continue on to determine fees which may need to be allocated to any other type of entity which might be associated with the transaction, as indicated by step 220.

As earlier discussed, the allocation of fees among various parties may involve allocating a portion of a single fee or determining, charging, and allocating separate fees. It should also be understood and appreciated that such allocations may be subject to certain limitations, such that some transactions below or above a certain amount do not permit the allocation of fee portions or additional fees at all, or such that the fees to be allocated are tiered or scaled depending on the monetary value of the transaction involved. It should also be understood and appreciated that the allocated fees may be percentage-based, fixed amounts, or combinations thereof, again subject to certain limitations or subject to certain categories, depending on, for example, (a) the fee charged by the processing entity, (b) the overall monetary value of the transaction, or (c) the overall number of entities to which a fee is to be allocated. Accordingly, in this last regard, an additional processing step may involve making reallocations, depending on arrangements or agreements between the various parties involved.

Thus, for example, a particular transaction may involve a sale of $10.00 worth of goods, and the processing entity may charge a 3% fee for authorizing, processing, and settling the transaction; 3% of $10.00 is $0.30. Assume further, for this example, that any other entities which are entitled to a fee have an agreement with the processing entity such that their fees are determined and allocated from this $0.30 fee. A particular communications company may, for example, be entitled to 50% (or $0.15) of the fee. However, the communications company may have a further agreement with a hardware provider, such that if a particular device is used to initiate the transaction, then the hardware company also shares in the fee, so that the hardware company is allocated one-half of the carrier company's fee. In other words, the carrier company and the hardware company would each be allocated $0.075. It will be understood and appreciated that a wide variety of scenarios and arrangements may exist and be developed for sharing in revenue associated with a transaction which is made electronically and which involves a wide variety of entities and services and products in the distribution channel.

Figure 4:
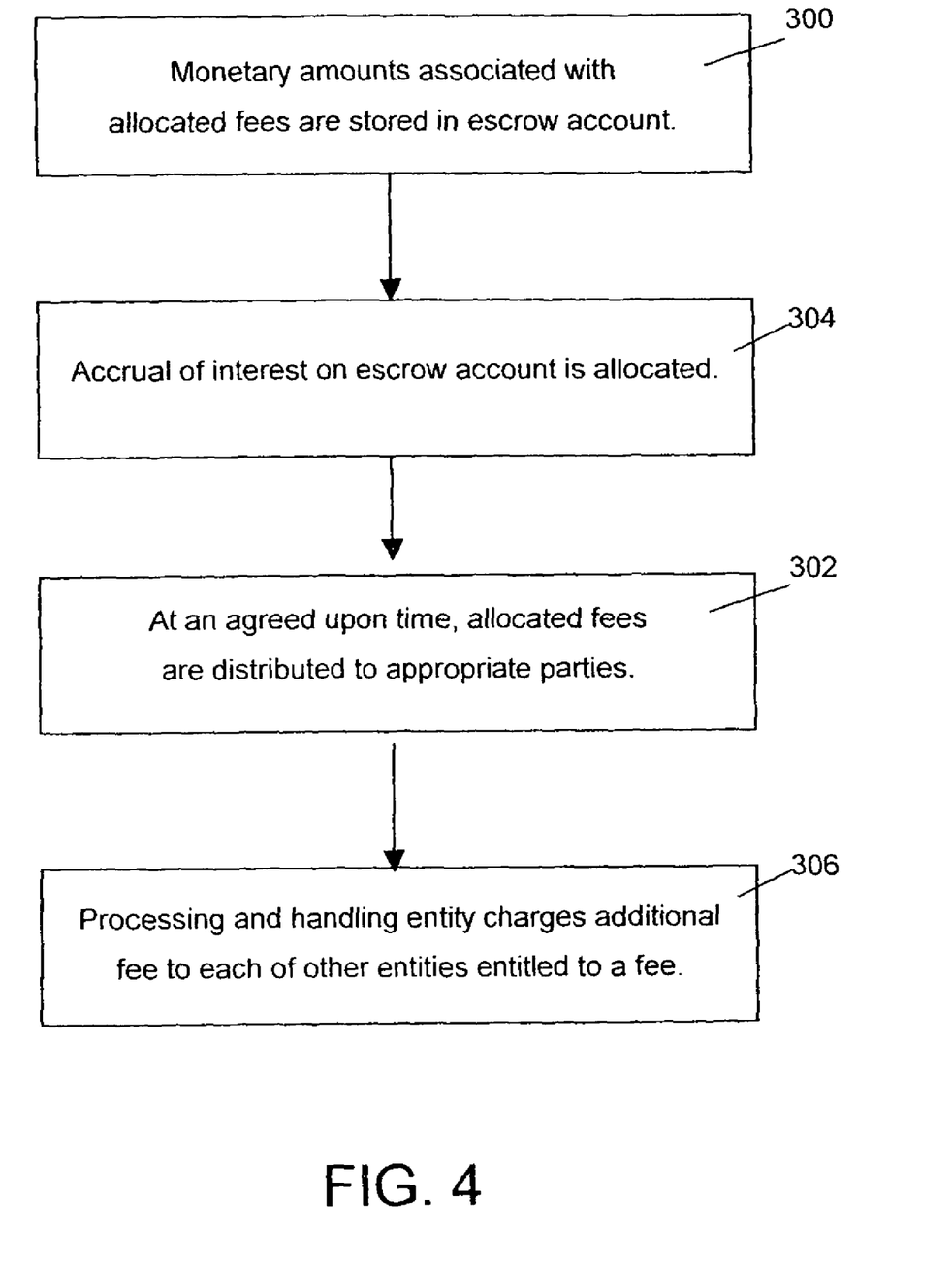
FIG. 4 is a third flowchart illustrating the steps in which allocated fees are held for a period of time and then distributed with or without interest.

Referring particularly to FIG. 4, an additional aspect of the present invention is shown in which monetary amounts associated with various allocated fees are stored in an escrow account until such time as they are to be distributed to the appropriate recipients of the fees, as indicated by step 300. It will be understood and appreciated that multiple accounts may be created to prevent co-mingling of funds, or, alternatively, a single account may be established. At an agreed upon time, the allocated fees are distributed to the appropriate parties, as indicated by step 302. It should be understood and appreciated that steps 300 and 302 may occur electronically, such as by processing transactions or settling transactions to accounts maintained by the various parties involved. It should further be understood that, at step 300, the processing entity itself is using its funds for business operations, and may not store its own money in the escrow account. Additionally, it should be understood that each of the various entities may be entitled to receipt of its fees at a different time or on a different time frame so that the distributions made at step 302 may not occur simultaneously, although they could indeed occur simultaneously, or substantially so.

In accordance with an additional aspect of the invention, as indicated by step 304, which is an intermediate step between steps 300 and 302 in a variation of this embodiment, the accrual of interest on the escrow account or accounts may be proportionally allocated to the various entitled recipients of fees, such that upon distribution of the fees at step 302, any accrued interest would also be distributed. Alternatively, it should be understood and appreciated that a single entity, or, at least, less than all of the entities with allocated fees earning interest, may be entitled to the interest, such as the entity handling the processing and management functions. Finally, it should be understood that distributions to the various entities, while they may certainly be made at the time of a transaction, are preferably accumulated in an account for periodic (e.g., monthly or quarterly) distribution.

Finally, in accordance with an additional aspect of the invention, the entity handling the processing and management of these allocations may charge yet an additional fee to each of the entities, whether by flat fee contract or as a percentage of each fee (or the accumulations over each period), as indicated by step 306.

From the foregoing, it will be seen that this invention is one well adapted to attain any and all ends and objects hereinabove set forth together with the other advantages which are obvious and which are inherent.

It will be understood that certain features and subcombinations are of utility and may be employed with reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A method comprising:
electronically processing a settlement of a purchase transaction initiated with a mobile communications device, wherein said mobile communications device has functionality for voice and data communications over a wireless communications link provided by a provider of wireless carrier services, said purchase transaction having a monetary amount and involving a sale of goods or services, wherein said electronically processing a settlement of a purchase transaction is performed with at least one electronic processor;

determining a fee associated with the electronic settlement of the purchase transaction, wherein said determining a fee associated with the electronic settlement of the purchase transaction is performed with at least one electronic processor; and allocating at least a portion of said determined fee to said provider of wireless carrier services, wherein said allocating at least a portion of said determined fee to said provider of wireless carrier services is performed with at least one electronic processor, wherein at least a part of said portion of said determined fee that is allocated to said
carrier is allocated to a provider of said mobile communications device, wherein said provider of wireless carrier services is different than said provider of the mobile communications device.

2. The method as set forth in claim 1, wherein said portion of said determined fee that is allocated to said provider of wireless carrier services is a first portion, said method further comprising allocating a second portion of the determined fee to a first party that electronically processes the transaction.

3. The method as set forth in claim 1, wherein said part of the determined fee that is allocated to said provider of said mobile communications device is based upon an agreement between said provider of wireless carrier services and said provider of said mobile communications device.

4. The method as set forth in claim 3, wherein said portion of said determined fee that is allocated to said provider of wireless carrier services is a first portion, said part of said determined fee that is allocated to said provider of said mobile communications device comprises a second portion, and wherein a third portion of said fee is provided to a provider of software used to initiate said transaction.

5. The method as set forth in claim 1, wherein said portion of said determined fee that is allocated to said provider of wireless carrier services is a first portion, wherein a second portion of the fee is allocated to a second party that is associated with a payment network or guarantor of the transaction.

6. The method as set forth in claim 1, wherein said portion of said determined fee that is allocated to said provider of wireless carrier services is a first portion, wherein a second portion of the fee is allocated to a second party to which royalties are owed for use of intellectual property pertaining to completion of the transaction or the electronic processing thereof.

7. The method as set forth in claim 1, wherein said portion of said determined fee that is allocated to said provider of wireless carrier services is a first portion, wherein a second portion of the fee is allocated to a second party associated with an electronic portal via which the transaction was made.

8. The method as set forth in claim 1, wherein said allocated portion of the fee is held in an escrow account until such time as a payout of the allocated portion is due.

9. The method as set forth in claim 8, wherein the allocated portion held in the escrow account earns interest.

10. The method as set forth in claim 9, wherein a prorated portion of the interest is paid at an agreed upon time to the provider of wireless carrier services associated with the allocated portion held in the escrow account.

11. The method as set forth in claim 9, wherein a party that maintains the escrow account retains the interest.

12. The method as set forth in claim 1, wherein a party that electronically processes the transaction retains as a charge a part of said portion of the fee to be allocated to said provider of wireless carrier services.

13. The method as set forth in claim 1, further comprising the step of distributing the allocated portion of the fee to the provider of wireless carrier services.

14. The method as set forth in claim 1, further comprising the step of storing information indicative of the allocated portion in a memory.

15. The method as set forth in claim 14, further comprising the step of generating a report showing the stored information nation.

16. The method as set forth in claim 1, wherein a fee is allocated to a show-owner or producer associated with media used to stimulate the transaction.

17. A system for implementing the method of claim 1, wherein the system includes a processor and a memory for implementing the steps of the method.

18. A method comprising:
electronically processing a settlement of a purchase transaction initiated with a mobile communications device, wherein said mobile communications device has functionality for voice and data communications over a wireless communications link provided by a provider of wireless carrier services, said purchase transaction having a monetary amount and involving a sale of goods or services, wherein said electronically processing, a settlement of a purchase transaction is performed with at least one electronic processor;
determining a fee associated with the electronic settlement of the purchase transaction, wherein said determining a fee associated with the electronic settlement of the purchase transaction is performed with at least one electronic processor;
allocating at least a first portion of said determined fee to said provider of wireless carrier services, wherein said allocating at least a first portion of said determined fee to said provider of wireless carrier services is performed by at least one electronic processor; and
allocating at least a second portion of said determined fee to a provider of said mobile communications device, wherein said allocating at least a second portion of said determined fee to said provider of wireless carrier services is performed by at least one electronic processor,
wherein said provider of wireless carrier services is different than said provider of the mobile communications device.

19. The method as set forth in claim 18, wherein said method is a computer-implemented method and wherein said electronically processing a transaction, said determining a fee associated with the electronic processing of the transaction, said allocating at least a first portion of said determined fee to said provider of wireless carrier services, and said allocating at least a second portion of said determined fee to a provider of said mobile communications device are performed with at least one electronic processor.

20. The method as set forth in claim 18, said method further comprising allocating a third portion of the determined fee to a party that electronically processes the transaction.

21. The method as set forth in claim 20, said method further comprising allocating a fourth portion of the determined fee to a party that is associated with a payment network or guarantor of the transaction.

22. The method as set forth in claim 18, wherein allocation of said first and second portions of the determined fee is based upon an agreement between a party that electronically processes the transaction and at least one of said provider of wireless carrier services and said provider of said mobile communications device.

23. The method as set forth in claim 22, said method further comprising allocating a third portion of the determined fee to a provider of software used to initiate said transaction.

24. The method as set forth in claim 20, said method further comprising allocating a fourth portion of the determined fee to a party to which royalties are owed for use of intellectual property pertaining to completion of the transaction or the electronic processing thereof.

25. The method as set forth in claim 20, said method further comprising allocating a fourth portion of the determined fee to a party that is associated with an electronic portal via which the transaction was made.

26. The method as set forth in claim 18, wherein said allocated portions of the fee are held in an escrow account until such time as a payout of the allocated portion is due.

27. The method as set forth in claim 26, wherein the allocated portions held in the escrow account earn interest.

28. The method as set forth in claim 27, wherein a prorated portion of the interest is paid at an agreed upon time to the provider of wireless carrier services associated with the allocated portion held in the escrow account.

29. The method as set forth in claim 27, wherein a party that maintains the escrow account retains the interest.

30. The method as set forth in claim 18, wherein a party that electronically processes the transaction retains as a charge a part of said first portion of the fee to be allocated to said provider of wireless carrier services.

31. The method as set forth in claim 18, further comprising the step of distributing the allocated first portion of the fee to the provider of wireless carrier services.

32. The method as set forth in claim 18, further comprising the step of storing information indicative of the allocated first and second portions in a memory.

33. The method as set forth in claim 32, further comprising the step of generating a report showing the stored information.

34. The method as set forth in claim 18, wherein a fee is allocated to a show-owner or producer associated with media used to stimulate the transaction.

35. A system for implementing the method of claim 18, wherein the system includes a processor and a memory for implementing the steps of the method.

36. The method as set forth in claim 1, wherein said part of said portion of said determined fee that is allocated to said carrier is allocated to a provider of said mobile communications device is a first part, and wherein a second part of said portion of said determined fee that is allocated to said carrier is allocated to a provider of search services.

37. The method as set forth in claim 1, wherein said portion of said determined fee that is allocated to said provider of wireless carrier services is a first portion, wherein a second portion of the fee is allocated to a provider of search services.

38. The method as set forth in claim 1, wherein said fee comprises a percentage of said monetary amount.

39. The method as set forth in claim 1, wherein said fee comprises a fixed fee.

40. The method as set forth in claim 1, wherein said fee comprises a combination of a percentage of said monetary amount and a fixed fee.

41. The method as set forth in claim 1, wherein said fee comprises a processing fee.

42. The method as set forth in claim 1, wherein said fee is discounted from said monetary amount of said purchase transaction.

43. The method as set forth in claim 18, said method further comprising allocating a third portion of the determined fee to a provider of search services.

44. The method as set forth in claim 18, wherein said fee comprises a percentage of said monetary amount.

45. The method as set forth in claim 18, wherein said fee comprises a fixed fee.

46. The method as set forth in claim 18, wherein said fee comprises a combination of a percentage of said monetary amount and a fixed fee.

47. The method as set forth in claim 18, wherein said fee comprises a processing fee.

48. The method as set forth in claim 18, wherein said fee is discounted from said monetary amount of said purchase transaction.

* * * * *